United States Patent
Kuwahara

(10) Patent No.: US 8,531,689 B2
(45) Date of Patent: Sep. 10, 2013

(54) IMAGE FORMING DEVICE

(75) Inventor: Tetsuya Kuwahara, Kyoto (JP)

(73) Assignee: Murata Machinery Ltd., Kyoto-shi (JP)

( * ) Notice: Subject to any disclaimer, the term of this patent is extended or adjusted under 35 U.S.C. 154(b) by 490 days.

(21) Appl. No.: 12/970,876

(22) Filed: Dec. 16, 2010

(65) Prior Publication Data

US 2011/0149324 A1     Jun. 23, 2011

(30) Foreign Application Priority Data

Dec. 17, 2009  (JP) ................................ 2009-286710

(51) Int. Cl.
- *G06F 3/12* (2006.01)
- *G06F 15/177* (2006.01)
- *G06F 15/16* (2006.01)
- *G06K 15/00* (2006.01)

(52) U.S. Cl.
USPC ........ 358/1.13; 358/1.14; 358/1.15; 709/220; 709/203; 709/207

(58) Field of Classification Search
None
See application file for complete search history.

(56) References Cited

U.S. PATENT DOCUMENTS

| | | | |
|---|---|---|---|
| 2002/0083431 A1 | 6/2002 | Machida | |
| 2007/0053000 A1 | 3/2007 | Nakamura | |
| 2007/0127054 A1* | 6/2007 | Nishizawa | 358/1.14 |
| 2007/0180245 A1* | 8/2007 | Maki | 713/168 |
| 2007/0185979 A1* | 8/2007 | Yoshida | 709/220 |
| 2008/0123135 A1* | 5/2008 | Inoue | 358/1.15 |
| 2009/0128852 A1* | 5/2009 | Fujishita | 358/1.15 |
| 2009/0210575 A1* | 8/2009 | Matsushita | 710/19 |
| 2009/0251730 A1* | 10/2009 | Yamaguchi | 358/1.15 |

FOREIGN PATENT DOCUMENTS

| | | |
|---|---|---|
| JP | 2002-229751 | 8/2002 |
| JP | 2004-199470 | 7/2004 |
| JP | 2006-209504 | 8/2006 |
| JP | 2007-3870065 | 1/2007 |
| JP | 2007-69358 | 3/2007 |
| JP | 2007-086969 | 4/2007 |
| JP | 2007-140957 | 6/2007 |
| JP | 2007-304963 | 11/2007 |
| JP | 2008-272939 | 11/2008 |

* cited by examiner

*Primary Examiner* — Satwant Singh
(74) *Attorney, Agent, or Firm* — Adli Law Group P.C.

(57) ABSTRACT

An image forming device for printing print data received from a terminal device through a communication network; the image forming device including an acquiring unit, a storing unit, a determining unit, and a print control unit. The acquiring unit acquires terminal identification information of the terminal device from the terminal device to install a printer driver. The acquired terminal identification information is stored in the storing unit. When the print data is received and determination is made by the determining unit that the terminal identification information contained in the received print data does not match the terminal identification information stored in the storing unit, the print control unit accepts a print instruction from a user and executes printing of the received print data according to the print instruction.

11 Claims, 6 Drawing Sheets

(a)

(b)

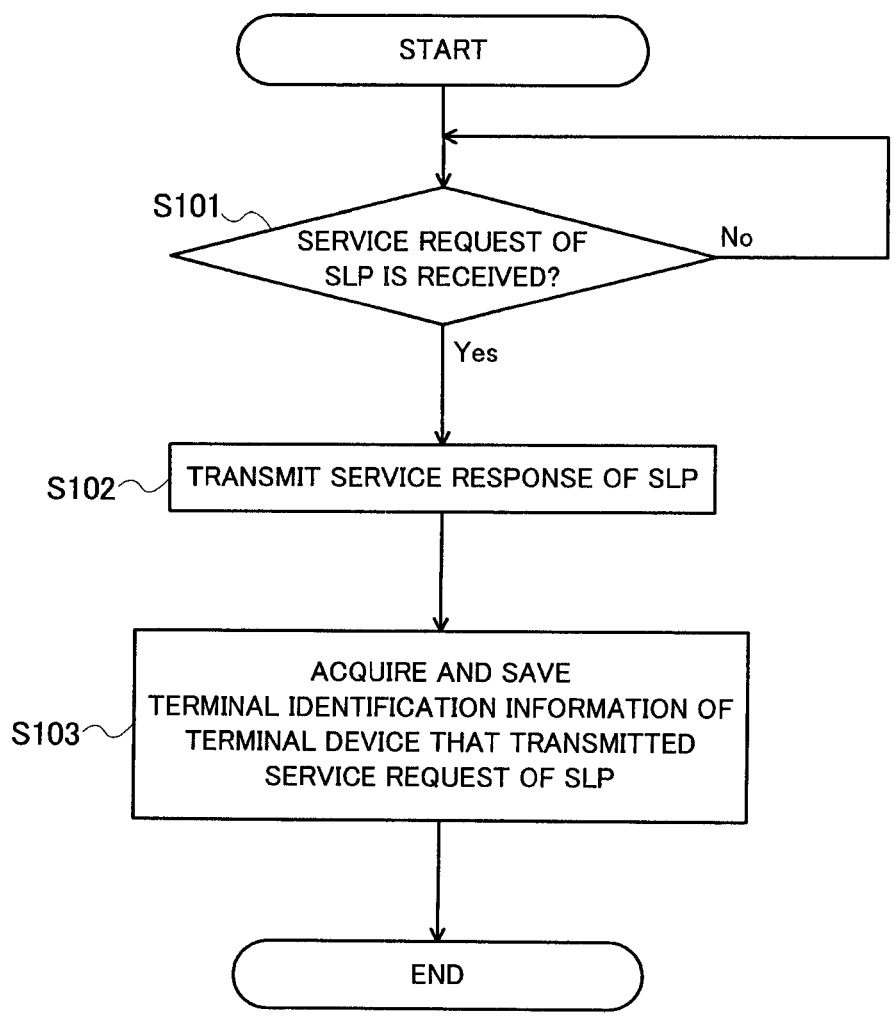

IMAGE FORMING DEVICE

CROSS-REFERENCE TO RELATED APPLICATIONS

This application claims priority under 35 U.S.C. 119 to Japanese Patent Application No. 2009-286710, filed on Dec. 17, 2009, which application is hereby incorporated by reference in its entirety.

BACKGROUND OF THE INVENTION

1. Field of the Invention

The present invention relates to an image forming device for printing print data received from a terminal device through a communication network.

2. Description of the Related Art

The image forming device is widely used in offices and the like as a multifunction peripheral having various functions such as a copy function, a scan function, and a facsimile function. The recent image forming device is connected with a plurality of terminal devices through a communication network such as a Local Area Network (LAN), and further has a printer function for outputting print data received from the terminal device.

However, such an image forming device constantly executes the printing of the received print data when receiving the print data from the terminal device. Therefore, even the print data that a user does not desire to print is sometimes printed.

Therefore, there is provided a print processing system, which stores in advance the terminal information in which printing is permitted for every connection mode, for printing the print data when matching with the terminal information read out from the received print data.

The print processing system requests the user to input in advance the terminal information in which printing is permitted from a registration screen to prevent the printing of the print data received from the unintended terminal device. However, the input of the terminal information is a troublesome task for the user. In particular, when the user inputs a MAC address for the terminal information, the address needs to be checked by opening the DOS screen, which is a very large load for the user.

In the print processing system, the printing is stopped when the terminal information read out from the print data does not match the stored terminal information. However, the user sometimes desires the printing of the received print data even if the received terminal information does not match the stored terminal information. For example, the print data is sometimes transmitted to the multifunction peripheral from a terminal device installed in a division different from the installed division of the multifunction peripheral, the terminal device in which the terminal information is not stored in a storage unit of the multifunction peripheral, according to the request of the user of the installed division of the multifunction peripheral. In such a case, the transmitted print data is not printed in the print processing system. Therefore, if the terminal information of the terminal of the transmission source of the print data is not stored, the printing is not carried out even if it is the print data the user desires to print.

SUMMARY OF THE INVENTION

It is an object of the present invention to execute printing of print data that is necessary for a user and to prevent printing of unnecessary print data without requesting for input of terminal information.

The present invention relates to an image forming device for printing print data received from a terminal device through a communication network; the image forming device including an acquiring unit, a storing unit, a determining unit, and a print control unit. The acquiring unit acquires terminal identification information of the terminal device from the terminal device to install a printer driver. The storing unit stores the terminal identification information acquired by the acquiring unit. The determining unit determines whether or not terminal identification information contained in the received print data matches the terminal identification information stored in the storing unit. The print control unit accepts a print instruction from a user and prints the received print data according to the print instruction when the determining unit determines that the terminal identification information contained in the received print data does not match the terminal identification information stored in the storing unit.

In such a device, the terminal identification information for identifying the terminal device is acquired from the terminal device and stored in the storing unit when the relevant terminal device installs the printer driver. The terminal identification information of the terminal device thus can be acquired without having the user input the terminal identification information.

In such a device, when the terminal identification information contained in the received print data does not match the terminal identification information stored in the storing unit, the instruction on whether or not to print is accepted from the user and the print data is printed according to the instruction of the user.

Therefore, the print data necessary to the user can be printed even if the print data is received from the terminal device which terminal identification information is not stored in the storing unit. For example, the user can print the received print data by instructing printing when notified beforehand that the print data will be received from the terminal device which terminal identification information is not stored in the storing unit.

The printing of the print data can be prevented for the print data that is received from the terminal device which terminal identification information is not stored in the storing unit and that is unnecessary to the user. For example, unnecessary print data such as advertisement data are sometimes transmitted from a distance. In such a case, the user can prevent the printing of such unnecessary data by not instructing printing.

The image forming device may further include an operation unit for accepting an input of the print instruction from the user. The print control unit may print the received print data when accepting the print instruction from the user through the operation unit.

The print data is printed according to the print instruction of the user accepted through the operation unit arranged in the image forming device. That is, the user who gives the instruction to print the print data actually goes to the installed location of the image forming device and gives the instruction to print through the operation unit. Therefore, the user can decide whether or not to execute printing and give the instruction to print after actually checking the printed print article. For example, the user can print one part of the print data and then check the outputted print article in situ. As a result of the check, when it is decided as the unnecessary print article, the user can give the instruction to rapidly stop the subsequent printing of the print data. The printing of the unnecessary print data is thereby prevented.

The image forming device may further include a distinguishing unit for distinguishing a page description language of the received print data. When the determining unit determines that the terminal identification information contained in the received print data does not match the terminal identification information stored in the storing unit and the distinguishing unit cannot distinguish the page description language of the received print data, the print control unit may accept the print instruction from the user and print the received print data according to the print instruction.

If the distinguishing unit can distinguish the page description language of the received print data, the print control unit may notify the page description language distinguished by the distinguishing unit. Here, the user can recognize the page description language and decide whether or not to print the received print data.

If the distinguishing unit cannot distinguish the page description language of the received print data, the print control unit may notify that the page description language cannot be distinguished. Here, the user can recognize that the page description language cannot be distinguished and decide whether or not to print the received print data.

The image forming device may further include a distinguishing unit for distinguishing a page description language of the received print data. When the determining unit determines that the terminal identification information contained in the received print data does not match the terminal identification information stored in the storing unit and the distinguishing unit can distinguish the page description language of the received print data, the print control unit may accept the print instruction from the user and print the received print data according to the print instruction.

The acquiring unit may further acquire terminal identification information of a terminal device which is a transmission source of the received print data when receiving the print data. When the determining unit determines that the terminal identification information contained in the received print data does not match the terminal identification information stored in the storing unit and the print control unit prints the received print data according to the print instruction from the user, the terminal identification information acquired by the acquiring unit may be stored in the storing unit.

In this case, the terminal identification information acquired by the acquiring unit is stored in the storing unit when the print data received from the terminal device having the terminal identification information that does not match the terminal identification information stored in the storing unit is printed according to the instruction of the user. Therefore, once the print data is printed, the terminal identification information of the terminal device as the transmission source can be stored in the storing unit. Thus, when receiving the print data from the same terminal device the next time, the print data can be rapidly printed without again accepting the instruction to print from the user.

The print control unit may rasterize the received print data, and then accept the print instruction from the user. In this case, the rasterizing process is carried out before accepting the instruction to print from the user. Thus, the time required for the printing process after the print instruction from the user can be shortened.

The terminal identification information of the terminal device may be a MAC address.

The image forming device may further include an SLP processing unit for performing processing of a message regarding an SLP transmitted and received with the terminal device connected through the communication network. When the terminal device installs the printer driver, the SLP processing unit may transmit a service response including information regarding the page description language processable by the SLP processing unit to the terminal device upon receiving a service request regarding the acquisition of the page description language through the SLP from the terminal device.

The acquiring unit may acquire the terminal identification information of the terminal device contained in the service request.

In the image forming device according to the present invention, the terminal identification information can be acquired without requesting for the input of the terminal information to the user. Moreover, the printing of the print data necessary for the user can be executed and the printing of the unnecessary print data can be prevented even when receiving the print data from the terminal device which terminal identification information is not stored in the storing unit.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 4 is a flowchart illustrating a flow of process of acquiring and saving terminal identification information of a terminal device to install a printer driver.

DETAILED DESCRIPTION OF PREFERRED EMBODIMENTS

Figure 1:
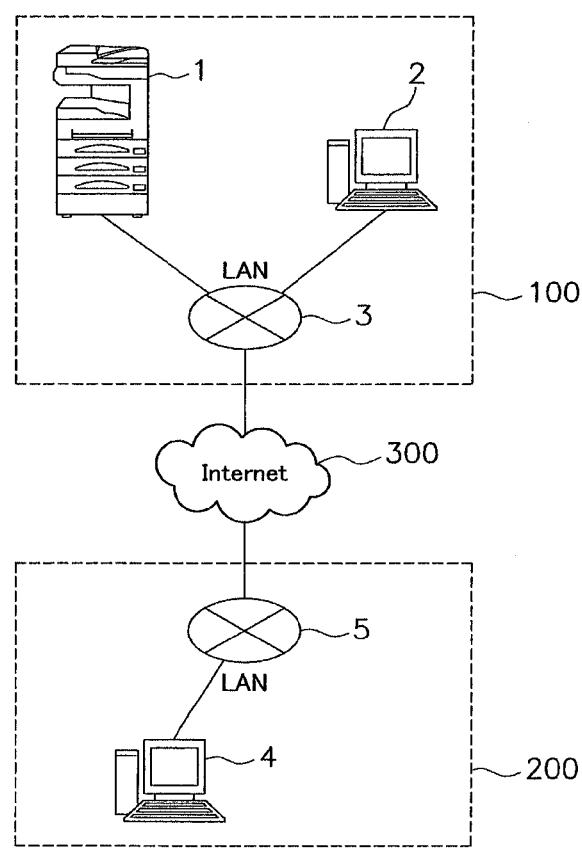
FIG. 1 is a view illustrating a network configuration example of a communication system including a multifunction peripheral.

Preferred embodiments of the present invention will be hereinafter described. First, an outline of a communication network will be described with reference to FIG. 1. FIG. 1 is a view illustrating a network configuration example of a communication system including a multifunction peripheral.

In the communication system illustrated in FIG. 1, a network system 100 and a network system 200 are connected through the Internet 300.

In the network system 100, a multifunction peripheral 1 and a terminal device 2 are connected through a Local Area Network (LAN) 3. In the network system 200, a terminal device 4 is connected to a LAN 5. The network system 100 and the network system 200 are built at places spaced apart from each other, and are network systems respectively built at different branches.

The multifunction peripheral 1 can print data transmitted from the terminal device 2 through the LAN 3. The multifunction peripheral 1 can print the print data transmitted from the terminal device 4 using an Internet Printing Protocol (IPP). Furthermore, the multifunction peripheral 1 can transmit a document scanned with its image scanning unit to the terminal device 2 and the terminal device 4. The details of the multifunction peripheral 1 will be hereinafter described.

The terminal device 2 and the terminal device 4 are personal computers used by a user. The terminal device 2 and the terminal device 4 include a controller, a storage unit, an operation unit, a display unit, a disc drive, and a communication interface (not illustrated).

The user of the terminal device 2 can use the printer function of the multifunction peripheral 1 through the LAN 3 to print the print data created in the terminal device 2. The user of the terminal device 2 installs, in advance, a printer driver compatible to the type of page description language (hereinafter referred to as PDL) that can be processed by the multifunction peripheral 1 before using the printer function of the multifunction peripheral 1.

In the present embodiment, the user of the terminal device 2 activates an installer of the printer driver by setting a driver CD in the disc driver, and the like, and searches and acquires the PDL that can be processed by the multifunction peripheral 1 using a Service Location Protocol (SLP). Specifically, the installer transmits a service request regarding the acquisition of the PDL to the multifunction peripheral 1 through the SLP. When receiving a service response including information regarding the PDL from the multifunction peripheral 1 through the SLP, the installer executes the installation of the printer driver compatible to the type of the received PDL.

The multifunction peripheral 1 is an image forming device having a printer function, a facsimile function, a copy function, and a scanner function.

Figure 2:
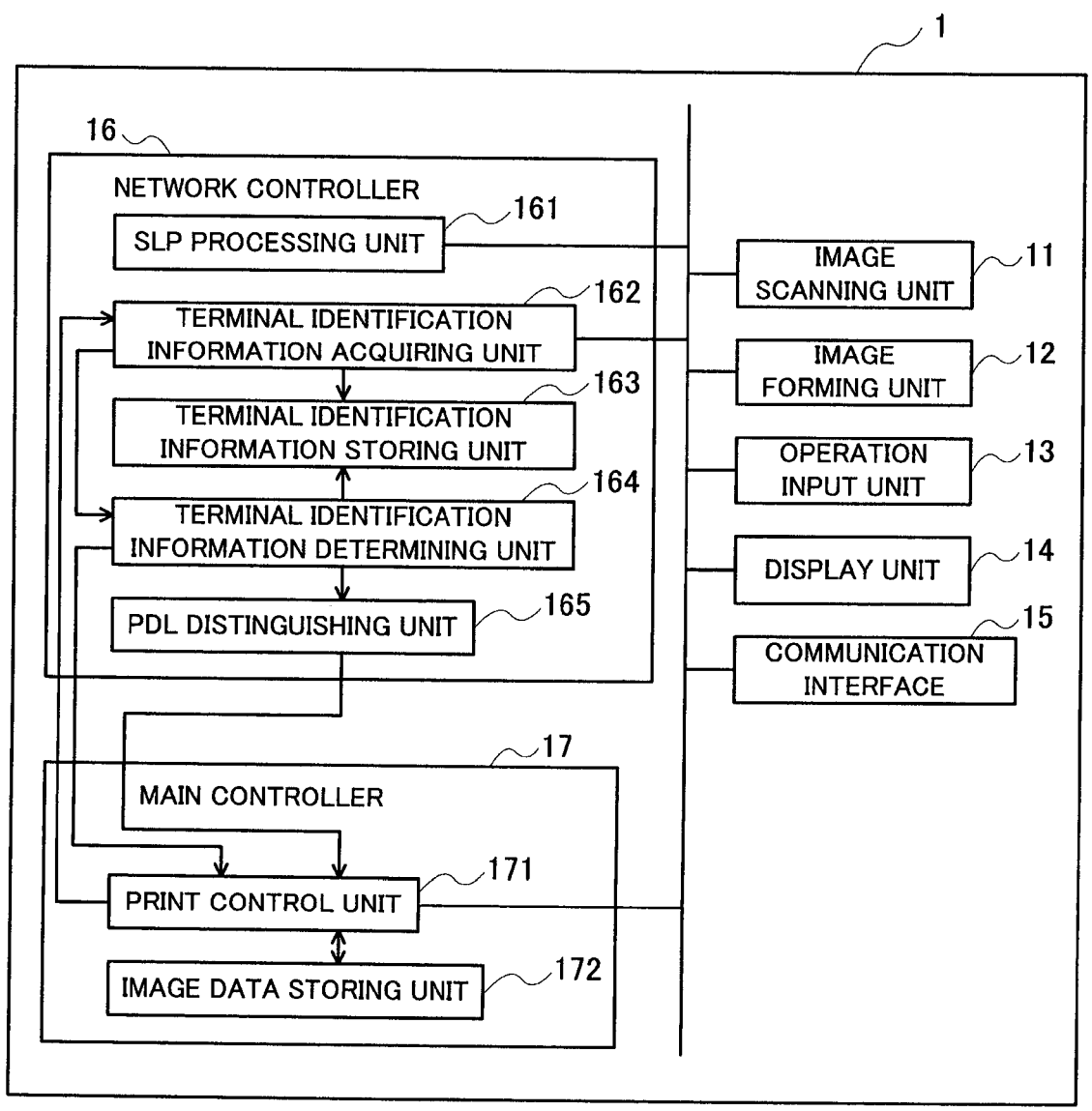
FIG. 2 is a block diagram illustrating a configuration of main parts of the multifunction peripheral.

The configuration of the multifunction peripheral 1 will be described with reference to FIG. 2. FIG. 2 is a block diagram illustrating the configuration of the main parts of the multifunction peripheral.

The multifunction peripheral 1 includes an image scanning unit 11, an image forming unit 12, an operation input unit 13, a display unit 14 serving as an operation unit, a communication interface 15, a network controller 16, and a main controller 17.

The image scanning unit 11 is a device for obtaining image information from a document. The image scanning unit 11 includes a document table, a scanning element, a light source, an optical member such as a mirror and a lens, an A/D converter, and a correcting unit. The scanning element scans the image from the document on the document table. The light source illuminates the document on the document table. The optical member is the mirror and the lens for guiding the reflected light from the document to the scanning element. The A/D converter converts the analog data outputted from the scanning element to digital data. The correcting unit performs data correction.

The image forming unit 12 is a device for printing on recording paper through an electrophotographic method, an inkjet method, or the like. The image forming unit 12 includes a photoreceptor, a charger device, an exposure device, a developing device, a cleaning device, a fuser device, and the like arranged around the photoreceptor, and the like.

The operation input unit 13 is configured by a hard key, and the like for inputting various instructions with respect to the multifunction peripheral 1.

The display unit 14 includes a display device such as a liquid crystal display panel, and a touch sensor. The display unit 14 presents various pieces of information regarding the multifunction peripheral 1 to the user and also accepts the input of instruction from the user.

The communication interface 15 performs transmission and reception of data using the SLP or a Transmission Control Protocol (TCP)/Internet Protocol (IP) with the terminal device 2 connected through the LAN 3 and the terminal device 4 connected to the Internet 300.

The network controller 16 controls the transmission and reception of data performed with the terminal device 2 and the terminal device 4. The network controller 16 is configured by a Central Processing Unit (CPU), a Read Only Memory (ROM), a Random Access Memory (RAM), and a Hard Disk Drive (HDD). The CPU carries out various operations to execute programs. The ROM stores programs and data necessary for the CPU to operate. The RAM stores temporary data and programs created in the execution of the program. The HDD stores terminal identification information.

The network controller 16 of the present embodiment includes an SLP processing unit 161, a terminal identification information acquiring unit 162, a terminal identification information storing unit 163, a terminal identification information determining unit 164, and a PDL distinguishing unit 165.

The SLP processing unit 161 performs processing of messages regarding the SLP transmitted and received with the terminal device 2 connected through the LAN 3.

The terminal identification information acquiring unit 162 acquires the terminal identification information. The terminal identification information indicates the terminal device which is the transmission source of the print data. The terminal identification information acquiring unit 162 also notifies the acquired terminal identification information to the terminal identification information determining unit 164, to be described later, and saves the same in the terminal identification information storing unit 163.

Specifically, when the terminal device 2 (a terminal device connected to the same LAN) installs the printer driver using the SLP, the terminal identification information acquiring unit 162 acquires the terminal identification information of the terminal device 2 contained in the service request of the SLP. The terminal identification information acquiring unit 162 then saves the acquired terminal identification information in the terminal identification information storing unit 163.

When receiving the print data through the LAN 3 or the Internet 300, the terminal identification information acquiring unit 162 acquires the terminal identification information of the terminal device which is the transmission source of the print data, and notifies the same to the terminal identification information determining unit 164. Furthermore, when the print data received from the terminal device which terminal identification information is not stored in the terminal identification information storing unit 163 (hereinafter referred to as "non-registered terminal device") is printed according to the instruction of the user, the terminal identification information acquiring unit 162 saves the acquired terminal identification information in the terminal identification information storing unit 163. When the print data received from the terminal device which terminal identification information is stored in the terminal identification information storing unit 163 (hereinafter referred to as "registered terminal device") is printed according to the instruction of the user, the terminal identification information acquiring unit 162 does not save the terminal identification information in the terminal identification information storing unit 163.

In the present embodiment, the terminal identification information is a Media Access Control (MAC) address that is a value unique to the terminal device. The terminal identification information acquiring unit 162 acquires the MAC address of the terminal device from the received service request of the SLP or the print data.

The terminal identification information storing unit 163 stores the terminal identification information acquired by the terminal identification information acquiring unit 162.

The terminal identification information determining unit 164 determines whether or not the terminal identification information contained in the received print data is the terminal identification information stored in the terminal identification information storing unit 163. The terminal identification information determining unit 164 compares the terminal identification information notified from the terminal identification information acquiring unit 162 and the terminal identification information stored in the terminal identification information storing unit 163. When determined that the notified terminal identification information matches the terminal identification information stored in the terminal identification information storing unit 163 (i.e., the transmission source of the print data is registered terminal device), the terminal identification information determining unit 164 notifies the determination result to a print control unit 171 to be described later. On the other hand, when determined that the notified terminal identification information does not match the terminal identification information stored in the terminal identification information storing unit 163 (i.e., the transmission source of the print data is non-registered terminal device), the terminal identification information determining unit 164 notifies the determination result to the PDL distinguishing unit 165 to be described later.

The PDL distinguishing unit 165 distinguishes the PDL of the received print data when notified from the terminal identification information determining unit 164 the determination result that the terminal identification information does not match the terminal identification information stored in the terminal identification information storing unit 163. Specifically, the PDL distinguishing unit 165 distinguishes whether or not the PDL of the received print data is a processable type. When distinguished that the PDL of the received print data is a processable type, the PDL distinguishing unit 165 notifies the print control unit 171 of the type of PDL. On the other hand, when the type of PDL cannot be distinguished, the PDL distinguishing unit 165 notifies the print control unit 171 that the type of PDL is unknown.

The main controller 17 is a controller for controlling the operation of the image scanning unit 11 and the image forming unit 12.

The main controller 17 is configured by a CPU, a ROM, a RAM, and an HDD, similar to the network controller 16. The main controller 17 of the present embodiment includes the print control unit 171 and an image data storing unit 172.

The print control unit 171 performs the control of printing of the print data by the image forming unit 12. The print control unit 171 also performs the control of printing of the document data scanned by the image scanning unit 11. When receiving the print data through the LAN 3 or the Internet 300, the print control unit 171 performs the following control according to the determination result of the terminal identification information determining unit 164.

When determined that the terminal identification information contained in the received print data matches the terminal identification information stored in the terminal identification information storing unit 163, the print control unit 171 outputs the print data to the image forming unit 12 to execute printing.

When determined that the terminal identification information contained in the received print data does not match the terminal identification information stored in the terminal identification information storing unit 163, the print control unit 171 processes the print data as PDL data or text data according to the distinguishing result of the PDL distinguishing unit 165. The print control unit 171 also saves the processed data in the image data storing unit 172 as image data.

Figure 3A:
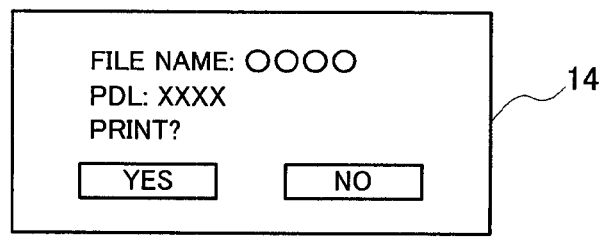
FIG. 3A is an example of a print instruction accepting screen.
Figure 3B:
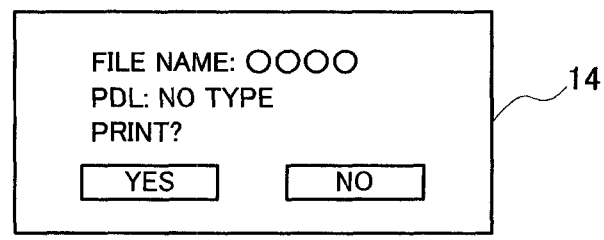
FIG. 3B is an example of a print instruction accepting screen.

Furthermore, the print control unit 171 outputs a print instruction accepting screen to the display unit 14 to accept the instruction from the user on whether or not to print the received print data. FIGS. 3A and 3B are examples of the print instruction accepting screen.

FIG. 3A illustrates an example of the print instruction accepting screen in a case where the PDL distinguishing unit 165 distinguishes that the PDL of the received print data is the processable type of PDL. The print control unit 171 displays on the display unit 14 "FILE NAME: ○○○○", "PDL: XXXX", and "print?". Here, a file name given to the transferred print data is displayed in the "FILE NAME: ○○○○". The distinguished specific type of PDL is displayed in the "PDL: XXXX". The print control unit 171 further displays "YES" "NO" on the display unit 14 to accept the instruction to print from the user. FIG. 3B illustrates an example of the print instruction accepting screen in a case where the PDL distinguishing unit 165 distinguishes that the PDL of the received print data is not the processable type of PDL, that is, the type of PDL is unknown. As opposed to FIG. 3A, the print control unit 171 displays "PDL: NO TYPE" on the display unit 14 as information regarding the PDL.

An example of the print instruction accepting screen has been described herein, but the present invention is not limited to such an example as long as it is a screen that can inform the information regarding the PDL to the user and accept the instruction to print from the user. For example, the terminal name of the terminal device that transmitted to the print data or the user name of the terminal device that transmitted the print data may be displayed in place of the "FILE NAME: ○○○○". A screen asking about the print range or the number of prints of the print data may be displayed.

If "YES" is selected in the screen of FIG. 3A or 3B and instruction to print is given from the user, the print control unit 171 outputs the image data saved in the image data storing unit 172 to the image forming unit 12 to execute printing. The print control unit 171 then deletes the outputted image data from the image data storing unit 172. If "NO" is selected in the screen of FIG. 3A or 3B, the print control unit 171 simply deletes the image data saved in the image data storing unit 172.

The print control unit 171 also performs processes such as rasterizing on the image data which is the print data performed with processes for the PDL data or the text data.

When the print data received from the non-registered terminal device is printed by the instruction of the user, the print control unit 171 makes a notification with respect to the terminal identification information acquiring unit 162 to save the terminal identification information of the terminal device in the terminal identification information storing unit 163. Specifically, the print control unit 171 displays a screen asking whether or not to save the terminal identification information on the display unit 14 and accepts the instruction regarding saving from the user. When the instruction to save the terminal identification information is given by the user, the print control unit 171 makes a notification to save the terminal identification information with respect to the terminal identification information acquiring unit 162.

The image data storing unit 172 is configured by the HDD, and stores the image data processed by the print control unit 171. The document data scanned by the image scanning unit 11 may be stored.

The process of acquiring and saving the terminal identification information from the terminal device to be installed with the printer driver will now be described with reference to FIG. 4. FIG. 4 is a flowchart illustrating a flow of processes of acquiring and saving the terminal identification information of the terminal device to install the printer driver.

An example in which the terminal device 2 is the terminal device to install the printer driver will be hereinafter described by way of example. As described above, the user of the terminal device 2 installs the printer driver compatible to the PDL, which can be processed by the multifunction peripheral 1, before using the print function of the multifunction peripheral 1. The installer then transmits the service request regarding the acquisition of the PDL to the multifunction peripheral 1 using the SLP.

At this time, the SLP processing unit 161 receives the service request regarding the acquisition of the PDL through the SLP from the terminal device 2 on the multifunction peripheral 1 side (step S101).

When receiving the service request, the SLP processing unit 161 transmits a service response including the information regarding the PDL, which it can process, to the terminal device 2 (step S102).

The terminal identification information acquiring unit 162 of the multifunction peripheral 1 then acquires the MAC address of the terminal device 2 contained in the service request, and saves the same in the terminal identification information storing unit 163 (step S103).

In this manner, the multifunction peripheral 1 acquires the MAC address of the terminal device 2 contained in the service request of the SLP as the terminal identification information and stores the same in the terminal identification information storing unit 163 when the terminal device 2 installs the printer driver using the SLP.

Figure 5:
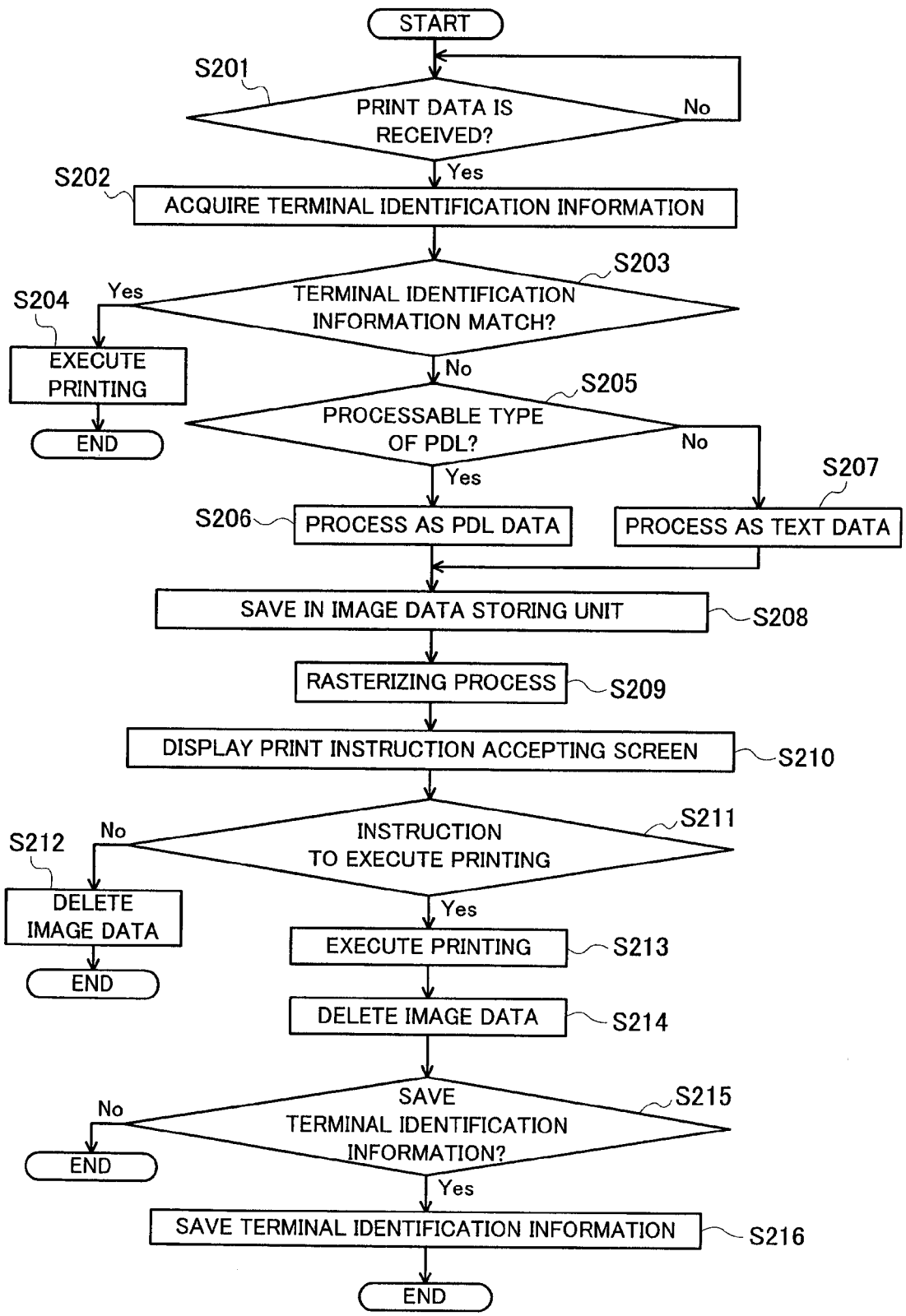
FIG. 5 is a flowchart illustrating a flow of a printing process of print data.

The printing process of the print data by the multifunction peripheral 1 will now be described. FIG. 5 is a flowchart illustrating a flow of a printing process of the print data.

The multifunction peripheral 1 receives the print data from one of the terminal devices through the LAN 3 or the Internet 300 (step S201). The terminal identification information acquiring unit 162 then acquires the MAC address of the per-terminal device contained in the received print data as the terminal identification information, and notifies the acquired terminal identification information to the terminal identification information determining unit 164 (step S202).

The terminal identification information determining unit 164 then determines whether or not the notified terminal identification information matches the terminal identification information stored in the terminal identification information storing unit 163 (step S203).

When determined that the notified terminal identification information matches the terminal identification information stored in the terminal identification information storing unit 163, the print control unit 171 outputs the print data to the image forming unit 12 to execute printing (step S204). For example, as described in FIG. 4, assume that the terminal identification information of the terminal device 2 is acquired by then from the terminal device 2 to install the printer driver and is stored in the terminal identification information storing unit 163. When the print data is received from the terminal device 2 in such a state, the terminal identification information determining unit 164 determines that the terminal identification information of the terminal device 2 contained in the print data matches the terminal identification information already stored in the terminal identification information storing unit 163. As a result, the print control unit 171 outputs the print data to the image forming unit 12 to execute printing.

When the terminal identification information determining unit 164 determines that the notified terminal identification information does not match the terminal identification information stored in the terminal identification information storing unit 163, the terminal identification information determining unit 164 notifies the determination result to the PDL distinguishing unit 165. For example, the terminal device 4 (see FIG. 1) belonging to the network system 200 generally installs only the printer driver of the multifunction peripheral (not illustrated) belonging to the same network system 200 using the SLP, and uses the print function. When receiving the print data from such a terminal device 4, the terminal identification information determining unit 164 determines that the terminal identification information of the terminal device 4 does not match the terminal identification information stored in the terminal identification information storing unit 163, and notifies the determination result to the PDL distinguishing unit 165.

The PDL distinguishing unit 165 that received the determination result distinguishes whether or not the PDL of the received print data is the processable type of PDL (step S205).

When distinguished that the PDL of the received print data is the processable type of PDL, the PDL distinguishing unit 165 notifies the type of PDL to the print control unit 171. The print control unit 171 that received the notification on the type of PDL processes the print data as the PDL data according to the notified type of PDL (step S206), and saves the processed print data in the image data storing unit 172 as image data (step S208). The print control unit 171 also stores the type of PDL.

When distinguished that the type of PDL of the received print data is unknown, that is, not the PDL it can process, the PDL distinguishing unit 165 notifies the notification "NO TYPE OF PDL" to the print control unit 171. The print control unit 171 that received the notification "NO TYPE OF PDL" processes the print data as text data (step S207), and saves the processed print data in the image data storing unit 172 as image data (step S208).

Thereafter, the print control unit 171 performs rasterizing process on the image data (step S209). An example of performing the rasterizing process on the image data saved in the image data storing unit 172 is described herein. However, the present invention is not limited to this example as long as the image data is subjected to the rasterizing process before displaying the print instruction accepting screen on the display unit 14. For example, the image data may be subjected to the rasterizing process and then saved in the image data storing unit 172.

The print control unit 171 then displays the print instruction accepting screen as illustrated in FIG. 3A or 3B on the display unit 14 according to the distinguishing result of the PDL distinguishing unit 165 (step S210). Subsequently, the print control unit 171 accepts the instruction to print from the user through the print instruction accepting screen (step S211).

When the instruction "do not execute print" is given from the user, the print control unit 171 deletes the image data saved in the image data storing unit 172 (step S212).

When the instruction "execute print" is given from the user, the print control unit 171 outputs the image data saved in the image data storing unit 172 to the image forming unit 12, and executes the printing of the image data (step S213). The print control unit 171 also deletes the image data, which printing is executed, from the image data storing unit 172 (step S214).

Thereafter, the print control unit 171 accepts an instruction from the user regarding whether or not to save the terminal identification information of the terminal device which is the transmission source of the print data which printing is executed in step S213 (step S215). In other words, when the print data is received from the non-registered terminal device and the print data is printed according to the instruction of the user, the print control unit 171 makes an inquiry to the user whether or not to save the terminal identification information of the terminal device in the terminal identification information storing unit 163.

For example, the print control unit 171 displays a screen asking about the need to save the terminal identification information and accepts the instruction regarding saving from the user. When the instruction "save terminal identification information" is given from the user, such notification is made to the terminal identification information acquiring unit 162. The terminal identification information acquiring unit 162 that received the notification saves the terminal identification information acquired in step S202 in the terminal identification information storing unit 163 (step S216). When the instruction "do not save terminal identification information" is given from the user, the printing process is terminated.

According to the multifunction peripheral 1, the MAC address of the terminal device 2 contained in the service request of the SLP received from the terminal device 2 can be acquired as the terminal identification information and saved in the terminal identification information storing unit 163 when the terminal device 2 in the same network system 100 installs the printer driver. Thus, the terminal identification information of the terminal device 2 can be acquired without requiring the input task of the terminal identification information by the user.

The MAC address unique to the terminal device 2 is acquired as the terminal identification information of the terminal device 2. Therefore, since the MAC address does not change even in an environment where an IP address of the terminal device 2 is dynamically assigned due to use of a Dynamic Host Configuration Protocol (DHCP) server, the once stored terminal identification information does not need to be subsequently changed.

According to the multifunction peripheral 1, if the terminal identification information contained in the received print data does not match the terminal identification information stored in the terminal identification information storing unit 163, the instruction on whether or not to print the print data is accepted from the user and the print data is printed according to the instruction of the user.

Therefore, when the print data is received from the non-registered terminal device such as the terminal device connected to a different LAN, the user can decide whether or not to print the print data. Thus, the print data necessary for the user can be printed and the unnecessary print data can be prevented from being printed.

For example, the print data such as an advertisement document is sometimes sent to the copy machine through the IPP from the remote non-registered terminal device.

However, the user may decide that the received print data is unnecessary since the terminal device is not registered and may stop the execution of printing by giving an instruction that printing is unnecessary.

The print data transmitted from the non-registered terminal device may be described with the PDL of the type not processable by the multifunction peripheral 1. In such a case, problems such as character corruption or the like may occur at the time of printing. For example, when the print data is transmitted from a host terminal such as UNIX (registered trademark), the print data transmitted from the host terminal may not be appropriately printed with the multifunction peripheral 1 due to the difference in PDL.

In such a case, however, the user may stop the execution of printing by giving the instruction that printing is unnecessary in view of the possibility that the character corruption or the like of printing may occur due to the difference in the PDL since the terminal device is the non-registered terminal device.

On the other hand, the print data sent from the non-registered terminal device to the multifunction peripheral 1 may include print data that the user desires to print. For example, the print data necessary for the user may be transmitted from the terminal device belonging to another branch different from the installed division of the multifunction peripheral 1 such as the terminal device 4 (see FIG. 1) to the multifunction peripheral 1. In such a case, the user gives an instruction to print when the print instruction display screen is displayed to print the print data from the terminal device 4 by receiving beforehand a notice regarding the transmission of the print data from the user on the terminal device 4 side.

According to the multifunction peripheral 1, the print data is printed without making an inquiry to the user about the need to print when the terminal identification information contained in the received print data matches the terminal identification information stored in the terminal identification information storing unit 163.

The terminal device which terminal identification information is stored in the terminal identification information storing unit 163 is the terminal device installed with the printer driver compatible to the PDL processable by the multifunction peripheral 1 such as the terminal device 2. Therefore, the problem of character corruption or the like due to difference in PDL does not occur by the print data received from such a terminal device. The unnecessary print data such as advertisement data is also not received from such a terminal device.

Therefore, when the print data is transmitted from the registered terminal device, the print data can be rapidly printed assuming it is the print data that requires printing for the user.

According to the multifunction peripheral 1, the instruction to print is accepted from the user through the print instruction accepting screen displayed on the display unit 14. That is, the user goes to the installed location of the multifunction peripheral 1 and gives the instruction to print. Therefore, the user actually checks the printed print article in situ and then decides whether or not to execute the printing of the print data and gives the instruction to print.

For example, as described above, a large amount of advertisement document may be sent to the multifunction peripheral 1 from the remote non-registered terminal device. A large amount of print data that may cause character corruption may also be sent to the multifunction peripheral 1 from the non-registered terminal device.

However, in the present embodiment, the user gives the instruction to print at the installed location of the multifunction peripheral 1. Thus, when the print instruction accepting screen is displayed on the display unit 14, the user may first give the instruction to print only one part of the print data. In this manner, the user can check whether or not the data is unnecessary or whether or not the character corruption has occurred with reference to the actually outputted print article. When deciding that the execution of printing is unnecessary as a result of the check, the user can instruct to stop the printing in situ and rapidly stop the printing of the subsequent print data.

According to the multifunction peripheral 1, the PDL distinguishing unit 165 for distinguishing the PDL of the received print data is further arranged. The distinguishing result on the type of PDL can be notified to the user by being included in the print instruction accepting screen and displayed on the display unit 14.

Therefore, the user can recognize the type of PDL or that the PDL is unknown and instruct printing.

When the print data received from the non-registered terminal device is printed according to the instruction of the user, the terminal identification information acquiring unit 162 saves the acquired terminal identification information in the terminal identification information storing unit 163. Therefore, once the print data is printed, the terminal identification information of the terminal device of the transmission source is stored in the terminal identification information storing unit 163. As a result, when the print data is subsequently received from the relevant terminal device, the print data can be rapidly printed without again accepting the instruction to print from the user.

The print control unit 171 accepts the print instruction by the user after rasterizing the received print data. Since the rasterizing process is carried out before accepting the print instruction by the user, the time required for the printing process after accepting the print instruction from the user can be shortened.

The preferred embodiments of the present invention have been described above, but the present invention is not limited to the above-described embodiments, and various modifications may be made without deviating from the gist of the invention.

In the present embodiment, the multifunction peripheral having the printer function, the facsimile function, the copy function, and the scanner function is described as an example of the image forming device. However, the present invention is not limited thereto as long as the device has a printer function capable of receiving and printing the print data from the terminal device connected through the communication network.

In the present embodiment, there has been described an example in which the PDL distinguishing unit 165 distinguishes the PDL of the print data when the print data is transmitted from the non-registered terminal device. However, in such a case, the distinguishing of the PDL of the print data by the PDL distinguishing unit 165 may be omitted.

In other words, the terminal identification information determining unit 164 may notify the determination result that the terminal identification information does not match the terminal identification information stored in the terminal identification information storing unit 163 to the print control unit 171 rather than the PDL distinguishing unit 165. Thereafter, the print control unit 171 saves the print data in the image data storing unit 172 and performs the rasterizing process on the print data, similar to the present embodiment. The print control unit 171 also displays the print instruction accepting screen on the display unit 14, and performs the print control according to the instruction to print from the user. In this case, however, the information such as the type of PDL is not displayed on the print instruction accepting screen.

In the present embodiment, there has been described an example of displaying the print instruction accepting screen and accepting the input of print instruction from the user through the display unit 14. However, the present invention is not limited to this example as long as the need to print and the information of the PDL can be notified to the user and the instruction to print can be accepted from the user. For example, the print instruction accepting screen may be displayed on the display unit 14, and the input of print instruction by the user may be accepted through the operation input unit 13. The multifunction peripheral 1 may further include a speaker and a microphone, and may make an inquiry about the print instruction with respect to the user and may accept the print instruction by audio.

The present invention can be used in the image forming device having the printer function, the facsimile function, the copy function, and the scanner function.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the present invention.

What is claimed is:

1. An image forming device for printing print data received from a terminal device through a communication network; the image forming device comprising:
    an acquiring unit for acquiring terminal identification information of the terminal device from the terminal device to install a printer driver;
    a storing unit for storing the terminal identification information acquired by the acquiring unit;
    a determining unit for determining whether or not terminal identification information contained in the received print data matches the terminal identification information stored in the storing unit; and
    a print control unit for accepting a print instruction from a user and printing the received print data according to the print instruction when the determining unit determines that the terminal identification information contained in the received print data does not match the terminal identification information stored in the storing unit.

2. The image forming device according to claim 1, further comprising an operation unit for accepting an input of the print instruction from the user; wherein
    the print control unit prints the received print data when accepting the print instruction from the user through the operation unit.

3. The image forming device according to claim 1, further comprising a distinguishing unit for distinguishing a page description language of the received print data, wherein
    when the determining unit determines that the terminal identification information contained in the received print data does not match the terminal identification information stored in the storing unit and the distinguishing unit cannot distinguish the page description language of the received print data, the print control unit accepts the print instruction from the user and prints the received print data according to the print instruction.

4. The image forming device according to claim 3, wherein the print control unit notifies the page description language distinguished by the distinguishing unit when the distinguishing unit can distinguish the page description language of the received page data.

5. The image forming device according to claim 3, wherein the print control unit notifies that the page description language is not distinguished when the distinguishing unit cannot distinguish the page description language of the received page data.

6. The image forming device according to claim 1, further comprising a distinguishing unit for distinguishing a page description language of the received print data, wherein
    when the determining unit determines that the terminal identification information contained in the received print data does not match the terminal identification information stored in the storing unit and the distinguishing unit can distinguish the page description language of the received print data, the print control unit accepts the print instruction from the user and prints the received print data according to the print instruction.

7. The image forming device according to claim 1, wherein the acquiring unit further acquires terminal identification information of a terminal device which is a transmission source of the received print data when receiving the print data; and when the determining unit determines that the terminal identification information contained in the received print data does not match the terminal identification information stored in the storing unit and the print control unit prints the received print data according to the print instruction from the user, the terminal identification information acquired by the acquiring unit is stored in the storing unit.

8. The image forming device according to claim 1, wherein the print control unit rasterizes the received print data, and then accepts the print instruction from the user.

9. The image forming device according to claim 1, wherein the terminal identification information of the terminal device is a MAC address.

10. The image forming device according to claim 1, further comprising:

an SLP processing unit for performing processing of a message regarding an SLP transmitted and received with the terminal device connected through the communication network; wherein when the terminal device installs the printer driver, the SLP processing unit transmits a service response including information regarding the page description language processable by the SLP processing unit to the terminal device upon receiving a service request regarding the acquisition of the page description language through the SLP from the terminal device.

11. The image forming device according to claim 10, wherein the acquiring unit acquires the terminal identification information of the terminal device contained in the service request.

* * * * *